(12) United States Patent
Xing et al.

(10) Patent No.: US 11,979,060 B2
(45) Date of Patent: May 7, 2024

(54) STATOR COOLING ARRANGEMENT

(71) Applicant: ABB Schweiz AG, Baden (CH)

(72) Inventors: Wei Xing, Raleigh, NC (US);
Ghanshyam Shrestha, Cary, NC (US)

(73) Assignee: ABB Schweiz AG, Baden (CH)

( * ) Notice: Subject to any disclaimer, the term of this patent is extended or adjusted under 35 U.S.C. 154(b) by 102 days.

(21) Appl. No.: 17/308,605

(22) Filed: May 5, 2021

(65) Prior Publication Data
US 2022/0360124 A1 Nov. 10, 2022

(51) Int. Cl.
H02K 1/20 (2006.01)
H02K 9/19 (2006.01)
H02K 15/02 (2006.01)

(52) U.S. Cl.
CPC ............... *H02K 1/20* (2013.01); *H02K 9/19* (2013.01); *H02K 15/02* (2013.01); *H02K 2213/03* (2013.01)

(58) Field of Classification Search
CPC .. H02K 1/20; H02K 3/38; H02K 5/20; H02K 9/22; H02K 9/225
See application file for complete search history.

(56) References Cited

U.S. PATENT DOCUMENTS

| | | |
|---|---|---|
| 8,072,100 B2 | 12/2011 | Monzel |
| 2010/0102649 A1 | 4/2010 | Cherney et al. |
| 2012/0074798 A1* | 3/2012 | Bywaters ............. H02K 15/028 310/216.113 |
| 2013/0076167 A1* | 3/2013 | Lepres ................... H02K 9/197 310/54 |
| 2015/0318770 A1* | 11/2015 | Behrendt ............. H02K 1/2786 428/421 |

* cited by examiner

Primary Examiner — Quyen P Leung
Assistant Examiner — Minki Chang
(74) Attorney, Agent, or Firm — Leydig, Voit & Mayer, Ltd.

(57) ABSTRACT

A stator assembly for a rotating electrical machine is operatively associated with an internal cooling circuit including a plurality of cooling channels disposed through a stator core. To directed a liquid coolant medium through the stator core without leakage, the internal cooling circuit is formed from a plurality of cooling tubes including linear tubes and elbow tubes. Linear tubes are disposed in the cooling channels and can be expanded with a hydraulic expansion tool to frictionally fit the linear tube therein. The elbow tubes can fluidly couple two or more linear tubes and are disposed proximately beyond the first and second axial end faces of the stator core. To encapsulate the elbow tubes, first and second stator end castings of thermally conductive, electrically isolating material can be cast adjacent the first and second axial end faces.

18 Claims, 6 Drawing Sheets

STATOR COOLING ARRANGEMENT

BACKGROUND

Rotating electrical machines such as motors and generators typically include a rotor accommodated within and rotatable with respect to fixed stator. The stator may include a stator core defining a rotor bore for accommodating the rotor and may include a plurality of stator windings in the form of wound conductive wires. The rotor, stator core, and stator windings are made from electromagnetic materials to electromagnetically interact with each other. In the case of a motor, an electric current applied to the stator windings causes the rotor to rotate and in the case of a generator, rotational motion applied to the rotor generates an electrical current in the stator windings.

During operation, the components of the rotating electrical machine generate heat due to, for example, electrical resistance of the stator windings, eddy currents induced by the electromagnetic interaction, bearing friction, and the like. To remove the generated heat, the rotating electrical machine may be constructed to interact with the surrounding environment for external cooling. For example, the rotating electrical machine may be equipped with external cooling fins and may be associated with fans to direct cooling air over the external fins on the machine.

However, to cool machines intended for larger applications, for example, on the order several hundred watts, air cooling may be insufficient or may require the machine include a significant amount of exposed surfaces that the power density is significantly reduced. Therefore, in larger applications, the rotating electrical machine can be configured for liquid cooling via a liquid internal cooling circuit or cooling arrangement. A liquid coolant medium such as water, oil, ethylene glycol, and mixtures thereof may be directed through channels disposed through the rotating electrical machine. Because the stator is fixed with respect to the rotor, the channels are most often disposed through the stator.

In larger rotating electrical machines and machines intended for industrial applications, the stator is typically constructed in a laminated form and includes a plurality of laminated plates or laminations that are stacked together. Constructing the rotor from a plurality of laminations instead of a solid block reduces the effect of eddy currents generated during operation. The laminations are planar structures in the outline of the stator core and may be fixed together in the lamination stack by welding, bonding, compressive forces or otherwise. Because of the laminated construction, though, the cooling liquid directed through the channels may leak through adjacent laminations. To prevent leakage, continuous pipes or tubing can be provided in the channels to direct the cooling liquid there through.

BRIEF SUMMARY

The disclosure describes a stator assembly for a rotating electrical machine associated with an internal cooling circuit utilizing a fluid coolant medium. The stator assembly can include a stator core defining a rotor bore and a plurality of conductive stator windings forming coils circumferentially disposed about the stator core with end turns protruding from the stator core. To remove heat generated during operation of the rotating electrical machine, a plurality of cooling channels are disposed through the stator core. The internal cooling circuit can include a plurality of linear tubes that are received in the cooling channels in the stator core and a plurality of elbow tubes that are used to fluid couple two or more linear tubes. The linear tubes may be hydraulically expanded to form a friction fit within the cooling channels to thus facilitate heat transfer from the stator winding disposed in the stator core. The elbow tubes are located outside the stator core and locationally extensive with the end turns of the stator windings. To facilitate transfer of thermal energy between the end turns of the stator windings and the elbow tubes of the internal cooling circuit, the end turns and the elbow tubes are encased in a stator end casting formed from thermally conductive electrically insulating material cast onto the axial end faces of the stator core.

A possible advantage of the disclosure is that the stator assembly can transfer thermal energy between the stator windings in the stator core and the linear tube and between the end turns and the elbow tubes in the stator end castings utilizing the same internal cooling circuit. This and other possible advantages and features will be apparent from the following detailed description and accompanying drawings.

DETAILED DESCRIPTION

Figure 1:
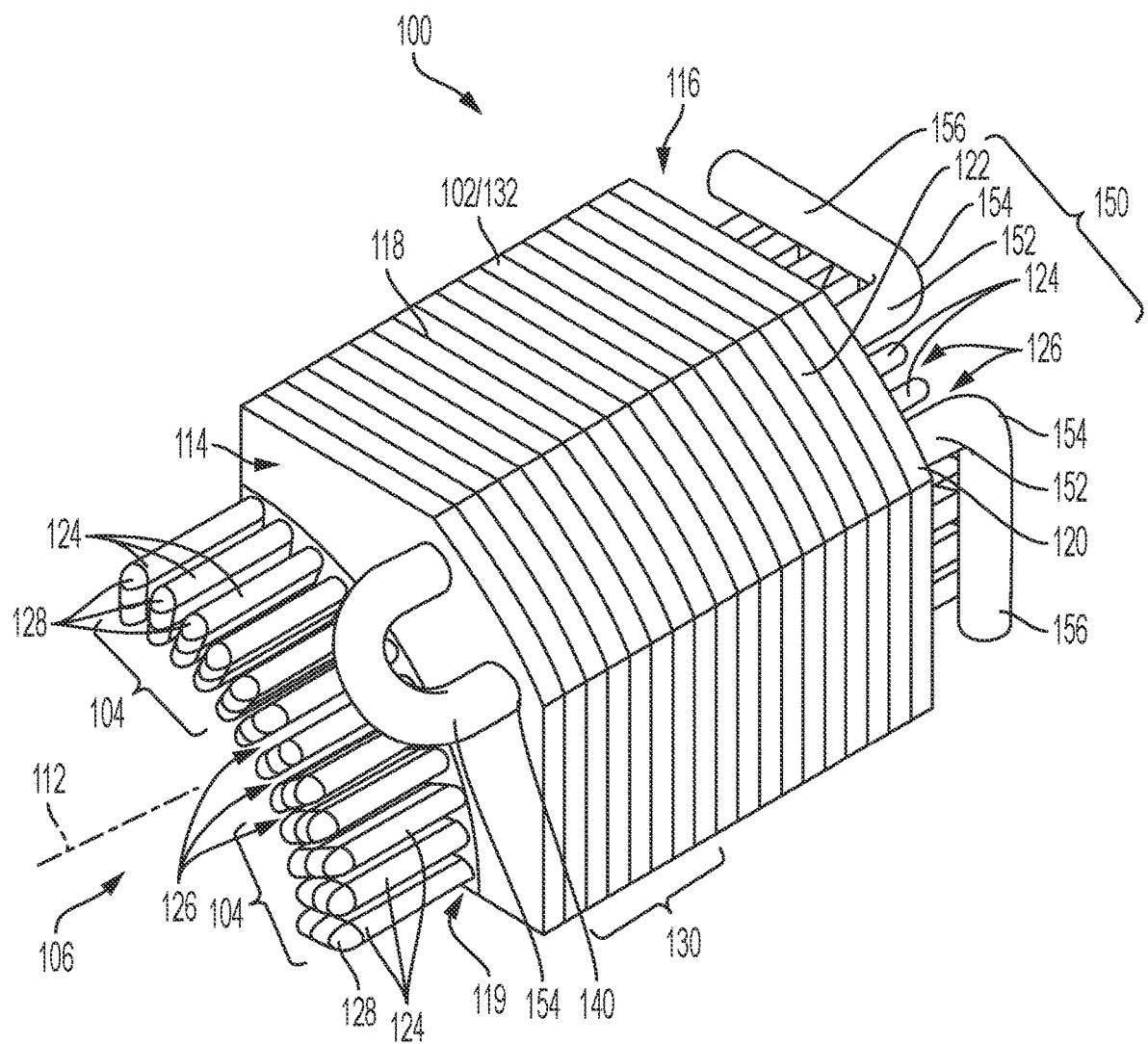
FIG. 1 is a perspective view of the stator assembly for a rotating electrical machine including a stator core with stator windings extending from and into the stator core and associated with an internal cooling circuit including a plurality of cooling tubes.
Figure 2:
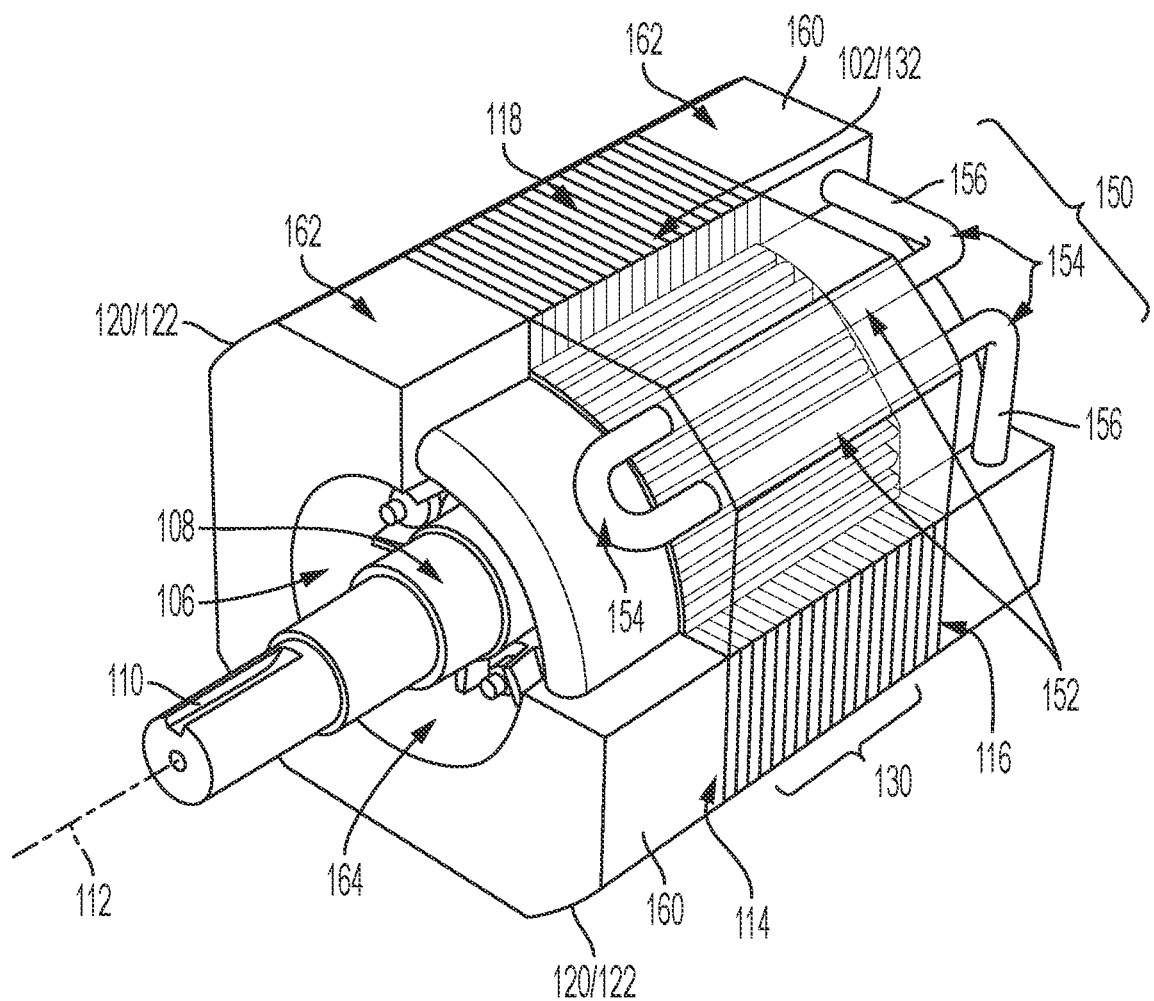
FIG. 2 is a cutaway perspective view of the stator assembly of FIG. 1 further including a stator end casting mounted to the stator core and illustrating the plurality of cooling tubes disposed through the stator core and stator end casting.

Now referring to the drawings where, whenever possible, like reference numbers will refer to like elements, there is illustrated in FIGS. 1 and 2 a stator assembly 100 for a rotating electrical machine such as, for example, an electric motor that converts electrical energy to rotational motion that is output via a rotating motor shaft that is applied to a load. Aspects of the disclosure, however, will be applicable to other types of rotating electrical machines such as generators and to non-rotating machines such as linear actuators. Additionally, the stator assembly 100 may be particularly designed for alternative current motors operating on single phase or polyphase electrical current and intended to produce kilowatt levels of power and intended for industrial applications. However, aspects of the disclosure are applicable to motors of various sizes and intended applications and having various different electrical characteristics.

The stator assembly 100 can include a stator core 102 made from a magnetically permeable ferroelectric material such as steel or iron and a plurality of stator windings 104 or coils made from conductive wires to conduct an electric current. The stator core 102 can define a hollow rotor cavity or rotor bore 106 disposed through the stator core for accommodating a rotor 108 assembled about the motor shaft 110. The rotor 108 may be cylindrical with an axially stepped configuration and is rotatably supported within the rotor bore 106 by bearings or the like so that the motor shaft 110 protrudes from the rotor bore. The rotor bore 106 likewise can be generally cylindrical in shape and defines a stator axis 112 of the electrical machine. Located at the axial ends of the stator core 102 and delineating the axial length of the stator core can be a first axial end face 114 and an opposite second axial end face 116 that are both generally planar and perpendicularly traverse to the stator axis 112.

The stator core 102 can also be demarcated by an outer periphery 118 that defines the exterior of the stator assembly 100 and a circular inner periphery corresponding 119 to the rotor bore 104. The outer periphery 118 can have various shapes and, in an example, may be polygonal and defined by a plurality of connected straight line edges or sides such as a quadrilateral square or rectangle. The polygonal outer periphery 118 can include a plurality of corners 120 including, for example, a first corner, second corner, third corner and fourth corner with the sum of the interior angles equaling 360°. In a particular example, the outer periphery 118 of the stator core 102 may be a chamfered polygon or chamfered square with a chamfer 122 formed at each of the corners 120 with the chamfers extending parallel to the stator axis 112. In other embodiments, the outer periphery 118 may include other shapes such as annular, round, or cruciform, and the polygonal corners may be rounded or beveled.

To accommodate the windings 104, the circular inner periphery 119 can include a plurality of elongated stator teeth 124 that are radially arranged and disposed circumferentially around the stator axis 112 and that extend parallel to the stator axis 112. The plurality of stator teeth 124 can be radially disposed into the inner periphery 119 toward the outer periphery 118 and can be circumferentially separated from each other to define stator slots 126. Hence, between each pair of adjacent stator teeth 124 there is disposed a stator slot 126 so that the teeth and slots circumferentially alternate about the circular inner periphery 119. The stator teeth 124 and the stator slots 126 can extend the axial length between the first axial end face 114 and the second axial end face 116 of the stator core 102 parallel with the stator axis 112.

The stator windings 104 can be elongated conductive wires of copper or other conductive material that extend within the stator slots 126 and are wound or looped around the stator teeth 124, and may be wound or wrapped about the same stator tooth or teeth a successive number of times to form a "coil." The coils formed from the stator windings 104 may wrap around one or more circumferentially adjacent stator teeth 124 depending upon the phase and pole configuration of the rotating electrical machine. The stator windings 104 can project beyond the first and second axial end faces 114, 116 of the stator core 102 and can loop or turn back 180° to reenter the stator slots 126 between the stator teeth 124. The portions of the windings 104 that protrude from the stator core 102 may be referred to as "ending windings" or "end turns" 128 and generally do not contribute to the generation of torque. The end turns 128 enable formation of the coils by causing the windings 114 to wrap around the stator teeth 124 a successive number of times.

When an alternating current is conducted through the stator windings 104, the current will generate a magnetic field or flux. Moreover, because of the periodic or wavelike nature of alternating current, the magnetic field produced by the stator windings 104 will circumferentially rotate around the circular inner periphery 119 of the stator core 102 and by extension around the stator axis 112. The rotating magnetic field can electromagnetically interact with the rotor 108 axially aligned with the stator axis 112 and disposed and rotatably supported within the rotor bore 106. The electromagnetic characteristics of the rotor 108 are responsive to and will magnetically lock with the rotating magnetic field from the stator assembly 100 causing the rotor to follow the field and rotate with respect to the stator axis 112. To produce a corresponding magnetic field in the rotor 108, the rotor may be a permanent magnetic rotor including a plurality of permanent magnets fixed as part of the rotor, may be an induction rotor having a squirrel cage or similar structure that inductively responds to the rotating stator field, or may be an externally excited rotor electrically communicating with an external power source to receive current and generate a rotor field countering the stator field.

Figure 3:
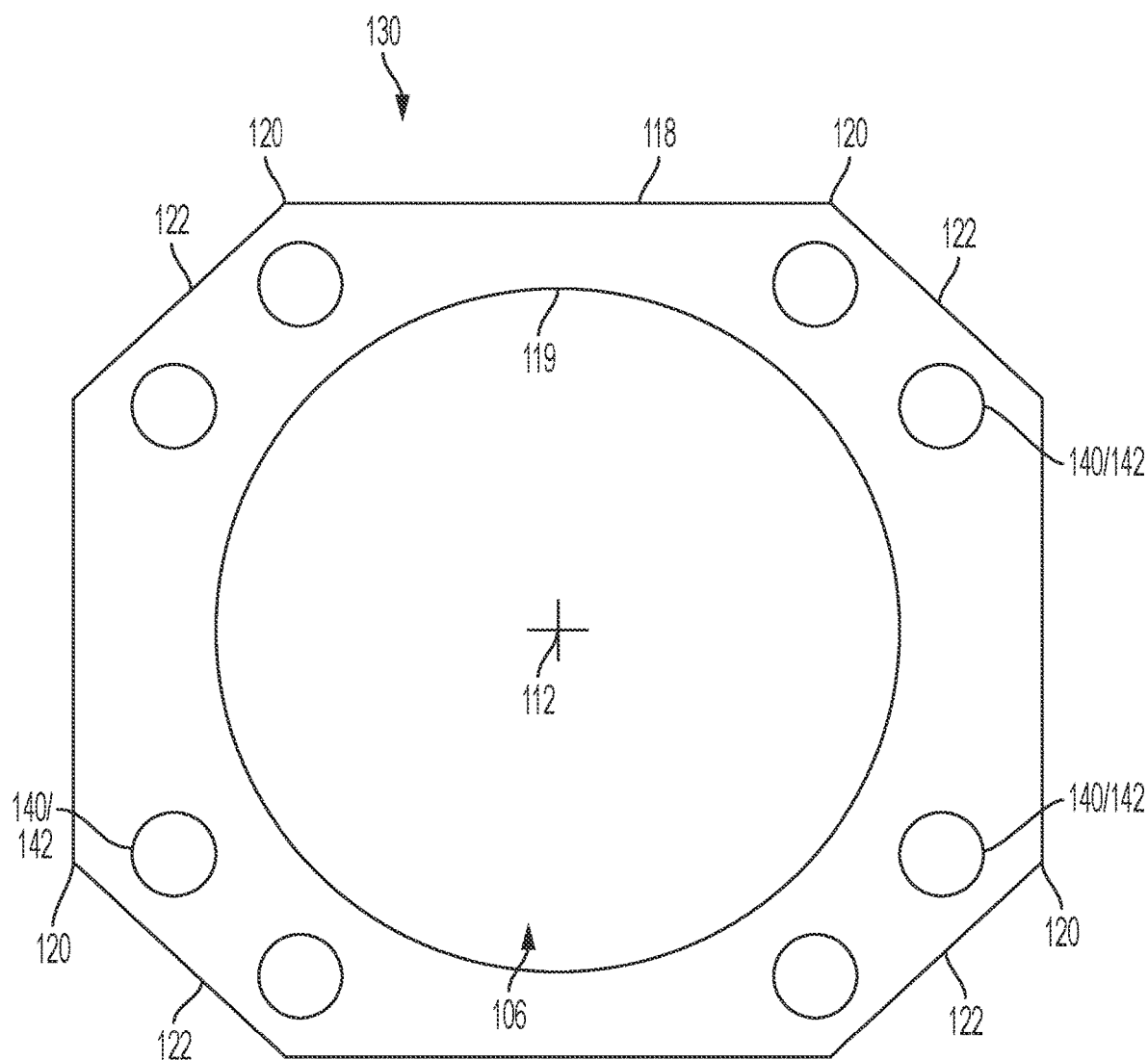
FIG. 3 is a front plane view of a lamination including a plurality of apertures corresponding to the cooling channels and that can be assembled with a plurality of other laminations to form a lamination stack.

To reduce the effect eddy current or hysteresis losses from the changing magnetic flux caused by the alternating current conducted in the stator windings 104, in a particular example, the stator core 102 may be constructed in laminated form and includes a plurality of laminated plates or laminations 130 that are stacked together. The individual laminations 130 are thin planar structures made from steel or another ferroelectric material. Referring to FIG. 3, the individual laminations 130 can each have a shape including an outer periphery and an inner periphery corresponding to the outer periphery 118 and inner periphery 119 of the stator core 102. The individual laminations 130 can be cut from a larger block, stamped from sheet metal, or otherwise formed. The plurality of laminations 130 are axially stacked together with individual laminations orthogonal to the stator axis 112 to form a lamination stack 132 corresponding to the size and shape of the stator core 102. Adjacent laminations 130 may be secured together in the lamination stack 132 by welding, adhesive bonding, fasteners, or other suitable techniques.

Even when the stator core 102 is fabricated as a lamination stack 132, the rotating electromagnetic field permeating the stator core 102 will generate heat that should be thermally dissipated or removed to prevent the rotating electrical machine from overheating. Heat may also be generated by the conductive resistance of the stator windings 104 disposed in the stator slots 126 or friction from the bearings supporting the rotor. To remove the heat generated in electrical machines of significant sizes and power characteristics, the stator assembly 100 can be configured with an internal cooling circuit or internal cooling arrangement that utilizes a liquid coolant medium directed through the stator core 102. Examples of suitable liquid coolant mediums include water, oil, ethylene glycol, and mixtures thereof. Heat in the form of thermal energy in the stator core 102 can transfer by a heat transfer mechanism like conduction and convection to the liquid coolant medium directed through the stator core and carried away from the core to be transferred to the external environment via a heat exchanger or the like.

The internal cooling circuit is characterized by directing the liquid coolant medium internally through the stator core 102 and may operate in conjunction with or instead of an external cooling arrangement that may be configured from fans and external cooling fins. The internal cooling circuit may eliminate the need for a convention housing used to cool rotating electrical machines by directly cooling the internal components and discharging thermal energy to the environment, resulting in less parts and reducing the cost of manufacture.

To receive and direct the liquid cooling medium, the stator core 102 can include a plurality of cooling channels 140 disposed through the lamination stack 132. The cooling channels 140 are voids or bores present in the stator core 102 and provide passage for the liquid coolant medium through the stator core. The cooling channels 140 can be disposed between the outer periphery 118 and the inner periphery 119 of the stator core 102 and are radially disposed around rotor bore 106 and the stator axis 112. The cooling channels 140 can extend lengthwise through the stator core 102 between the first and second axial end faces 114, 116 and may be parallel to the stator axis 112. However, other arrangements of the cooling channels 140 are contemplated; for example, the cooling channels may extend circumferentially around the stator axis 112 in the stator core 102.

The cooling channels 140 can have any suitable cross sectional shape including circular, oval, polygonal or the like. Referring to FIG. 3, in the example of circular cooling channels 140, the diameters of the cooling channels 140 are significantly smaller than the diameter of the rotor bore 106 and the volume is significantly smaller. The cooling channels 140 can also assume any suitable pattern within the stator core 102 or may be arranged randomly. In the example where the outer periphery 118 of the rotor core 102 is shaped as a polygon, the cooling channels 140 can be located proximate to or within the corners 120 of the stator core 102 and which are hereinafter designated inside corners. In other words, the cooling channels 140 can be associated with a position located within the inside corners 120, in contrast to a position adjacent to and midlength of the edges or sides of the polygonal outer periphery 118. Locating the cooling channels 140 within the inside corners 120 of the stator core 102 may remove them from the flux path of the stator assembly 100 that generates about the stator axis 112. Moreover, where the outer periphery 118 is a chamfered polygon, the cooling channels 140 can extend generally adjacent to the chamfers 122 along the axial length of the stator core 102. In the examples where the stator core 102 has other shapes, the cooling channels 140 can assume other patterns and configurations. The cooling channels 140 can be formed by drilling or boring apertures though the stator core 102 or, in the examples of a lamination stack 132, apertures 142 corresponding to the cooling channels 140 can be formed in the individual laminations 130. When the laminations 130 are layered together, the apertures 142 can align to form the cooling channels 140.

Referring to FIGS. 1 and 2, when the plurality of laminations 130 are adjacently arranged in a lamination stack 132, the cooling channels 140 may not be sufficiently sealed and the liquid coolant medium may leak between adjacent laminations 130. This leads to a loss of liquid coolant and possibly faulty operation of the rotating electrical machine that the stator assembly 100 is to become part of. To avoid leakage of liquid coolant medium between the adjacent laminations 130, conduits such as cooling tubes 150 or cooling pipes can be inserted and disposed inside the cooling channels 140. The cooling tubes 150 can be hollow structures that define the conduit path for the conveyance of the coolant medium. The cooling tubes 150 can be made from a material such as copper or bronze and can have a shape generally corresponding to the shape of the cooling channels 140, for example, circular or polygonal. In the example of circular cooling channels 10, the cooling tubes 150 can have an outer diameter that is slightly smaller in dimension than the inner diameter of the cooling channels so that the cooling tubes may be received therein via a clearance fit.

To direct the liquid coolant medium through the stator core 102, the plurality of coolant tubes 150 can include a plurality of linear tubes 152 that are elongated and straight and can include a plurality of elbow tubes 154 to fluidly couple two or more linear tubes by changing the direction of flow. The linear tubes 152 can be disposed in the cooling channels 140 so that they extend across the axial length of the stator core 102 between the first and second axial end faces 110, 112 and are parallel to the stator axis 108. To enable the linear tubes 152 to connect with the elbow tubes 154, the axial length of the linear tubes can be larger than the length of the stator core 102 so the axial ends of the linear tubes can extend or project beyond the first and second axial end faces 114, 116 of the stator core 102. The elbow tubes 154 can connect to and be joined with the axial ends of the linear tubes 152 by any suitable process including by welding, brazing, screw threads, or any other suitable method. The elbow tubes 154 are therefore located or disposed outside of the stator core 102 and can change the direction of fluid flow with respect to the first and/or second axial end faces 114, 116. Depending upon the pattern of coolant channels 140 disposed in the stator core 102 and the arrangement of linear tubes 152 therein, the elbow tubes 154 can have various degrees of bending including, for example, a 90° (quarter) bend or a 180° (reverse or U-shaped) bend although any suitable range of bending of the elbow tubes depending upon the pattern of the cooling circuit about the stator.

By way of example, the coolant tubes 150 can be arranged in a pattern to axially traverse the stator core 102 in multiple passes so that the liquid coolant medium is sufficiently exposed to the stator core and thermal energy is adequately transferred to the liquid coolant medium. The pattern can include two cooling channels 140 that are disposed generally within the location of each inside corner 120 of the stator core 102 that extend parallel with and adjacent to the chamfers 122. A linear tube 152 is inserted in each of the cooling channels 140 so as to traverse the axial length of the stator core 102. To couple the two linear tubes 152 that may be commonly located in the same inside corner 120 of the stator core 102, a 180° or U-shaped elbow tube 154 can be joined to the axial ends of the linear tubes extending from the first axial end face 114. Accordingly, liquid coolant medium flowing in one linear tube 152 to exit the stator core 102 will be reversed and redirected back into the stator core 102 via the second linear tube 152 in the same inside corner 120 and fluidly coupled to the first linear tube via the elbow tube 154.

To complete the internal coolant circuit about the four inside corners 120 in the example where the stator core 102 has a rectangular or square shape, the cooling tubes 150 can include a plurality of traverse tubes 156 that extend between the linear tubes 152 in adjacent corners. A 90° degree or quarter bend elbow tube 154 can be used to connect the traverse tubes 156 to the axial ends of the linear tubes 152 extending from the second axial end face 116. Accordingly, the traverse tubes 156 extend parallel to the second axial end face 116 and generally traverse to the stator axis 112. Accordingly, the liquid coolant medium exiting the stator core 102 in one linear tube 152 will be redirected by the 90° elbow tube 154 to the traverse tube 156 that extends the width of the stator core 102 and can be redirected into the stator core via another linear tube 152 via another 90° elbow tube 154 located at an adjacent inside corner 120 of the stator core 102. It will be noted in the illustrated configuration, the 180° elbow tubes 154 are all next to the first axial end face 114 and the 90° elbow tubes 154 and traverse tubes 156 are all next to the second axial end face 116. In other examples, the elbow tubes 154 may have different angles and may be located in different arrangements with respect to the stator core 102.

Because the elbow tubes 154 and the traverse tubes 156 are disposed outside of the stator core 102 adjacent to the first and second axial end faces 114, 116, the elbow tubes and traverse tubes are axially coextensive with and generally proximate to the end turns 128 of the stator windings 104 exiting the axial end faces. The elbow tubes 154 and traverse tubes 156 therefore receive thermal energy from the end turns 128 by thermal conduction thereby providing additional cooling for the stator assembly 100. Referring to FIG. 2, to improve thermal conduction between the end turns 128 and the elbow tubes 154, the end turns 128 of the stator windings 104 can be encapsulated in a stator end casting 160 or molding that is formed adjacently on the first and second axial faces 114, 116 of the stator core 102. The stator end castings 160 increase the axial length of the stator assembly 100 and can encompass and encapsulate the elbow tubes 154 and the traverse tubes 156. The stator end casting 160 can be formed from a potting compound such as a thermal plastic material or an epoxy resin. The stator end castings 160 thus serves to electrically isolate the ending turns 128 from each other while conducting thermal energy to the elbow tubes 154 and the traverse tubes 156. For example, the thermally conductive, electrically isolating material may be silicone based and may include a metallic filler like aluminum or copper to increase thermal conductivity. The stator end castings 160 can have a shape similar to the shape of the stator core 102 including an outer periphery 162 that may be polygonal and an inner periphery 164 that aligns with the rotor bore 106 so the rotor can pass there through.

The stator end castings 160 can be molded or cast onto the first and second axial end faces 114, 116 of the stator core 102 via traditional molding techniques. For example, the axial end faces 114, 116 and the elbow tubes 154 and traverse tubes 156 extending therefrom can be placed into a mold or pot and the liquefied potting compound can be introduced therein. When the potting compound solidifies and sets, the stator end castings 160 will encase the end turns 128 of the windings 104 to transfer thermal energy or heat to the liquid coolant medium in the cooling tubes 150 and locationally fix the end turns 128 with respect to the stator assembly 100.

To promote heat transfer by thermal conduction between the stator core 102 and the cooling tubes 150 of the internal cooling circuit, the linear tubes 152 can form a friction fit or interference fit with the cooling channels 140 in which they are disposed. In particular, after fabrication of the stator assembly 100, the internal dimensions of the cooling channels 140 and the external dimensions of the linear tubes 152 will be the same so that the linear channels are tightly retained in the stator core 102 by compressive stresses. The compressive fit and adjacent contact between the inner surfaces of the cooling channels 140 and the exterior surfaces of the linear tubes 152 facilitates thermal conduction to the liquid coolant medium flowing in the internal cooling circuit.

To produce the friction fit fixing the cooling channels 140 and the linear tubes 152 therein, the linear tubes can be outwardly expanded within the channels using suitable techniques. For example, the linear tubes 152 can be hydraulically expanded in the stator core 102 using a hydraulic expansion tool that utilizes pressurized hydraulic fluid from a hydraulic source including a reservoir and pump, although in other examples, other pipe expansion techniques can be used. Schematically illustrated in FIGS. 4-8 is a representative process for assembling the stator assembly 100 by expanding the cooling tubes 150 within the cooling channels 140 using a hydraulic expansion tool, the steps of which are described in the flow diagram of FIG. 9. It will be appreciated the flow diagram is exemplary and that the order of steps can be changed and that steps may be added or omitted.

Figure 4:
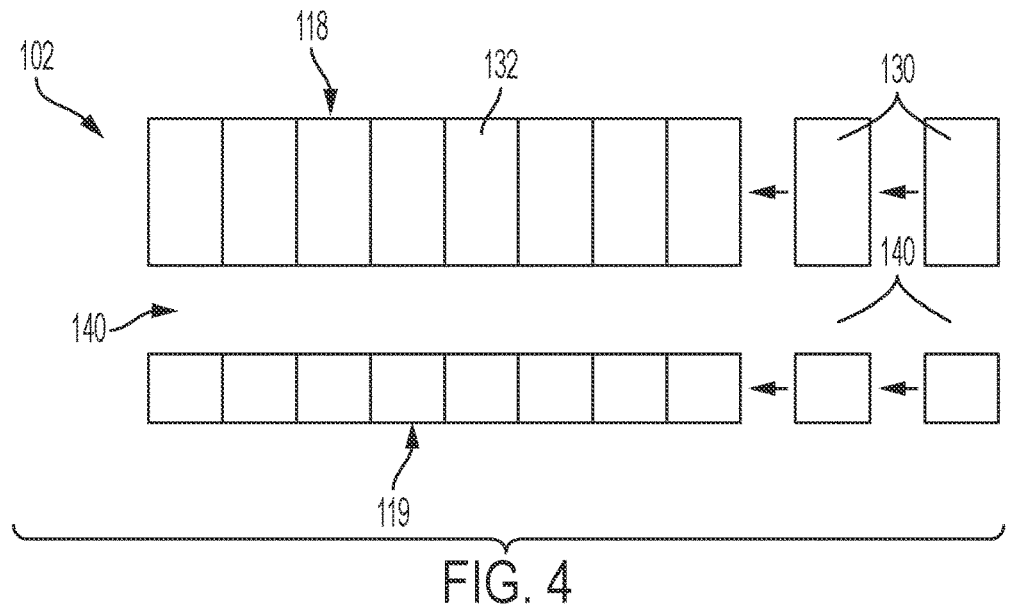
FIGS. 4 through 8 are a schematic illustrations of a method of assembling the internal cooling circuit by placing and hydraulically expanding the cooling tubes within the cooling channels disposed in the stator core.
Figure 9:
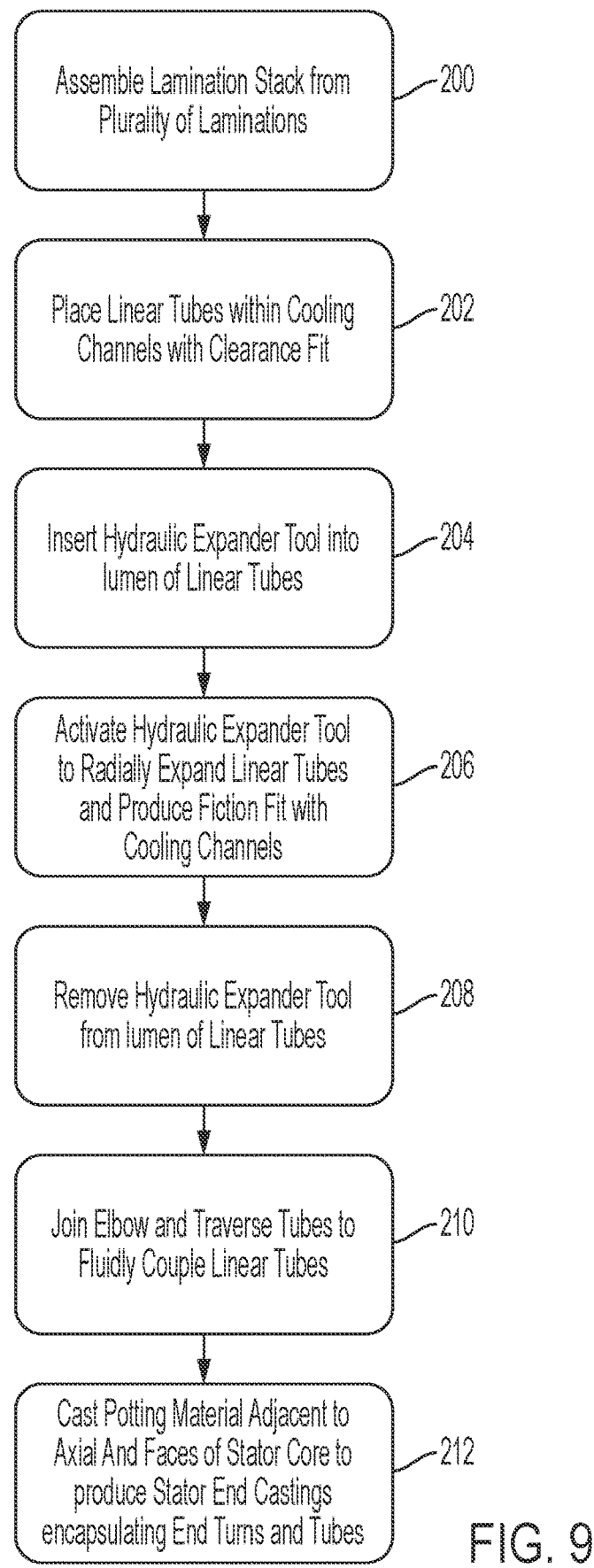
FIG. 9 is a flow diagram illustrating a plurality of possible steps for assembling the stator assembly and the internal cooling circuit in accordance with the disclosure.

For example, referring to FIGS. 4 and 9, in a stack assembly step 200 the lamination stack 132 can be fabricated from a plurality of individual planar laminations 130 that have a shape, including an outer periphery and an inner periphery, corresponding to the shape of the desired stator core 102. The individual laminations 130 can be placed adjacently against each other in the axial direction, as indicated by the arrows, to form the lamination stack 132. The individual laminations 130 can include a plurality of apertures 142 preformed therein, although in some examples, the apertures 142 can be drilled or bored after fabrication of the lamination stack 132. The individual laminations 130 are adjacently arranged so that the apertures 142 align to form the cooling channel 140 and the lamination stack 130 is secured together using suitable techniques like welding or bonding.

Figure 5:
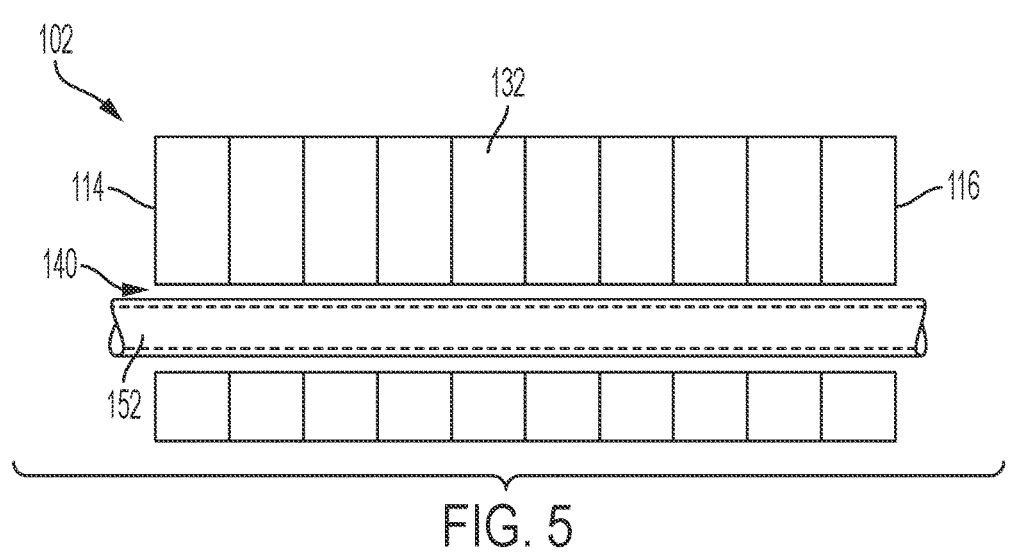

Referring to FIGS. 5 and 9, in a placement step 202, the linear tubes 152 can be received into the stator core 102 by inserting the tubes through the cooling channels 140. The linear tubes 152 are reduced in size compared to the cooling channels 140 to form a clearance fit and facilitate easy insertion. Accordingly, the exterior surfaces of the linear tubes 152 are spaced apart from the inner surfaces of the cooling channels 140. The linear tubes 152 can extend over the axial length of the lamination stack 132 to ensure that the axial ends of the linear tubes 152 project from the first and second axial end faces 114, 116 of the stator core 102.

Figure 6:
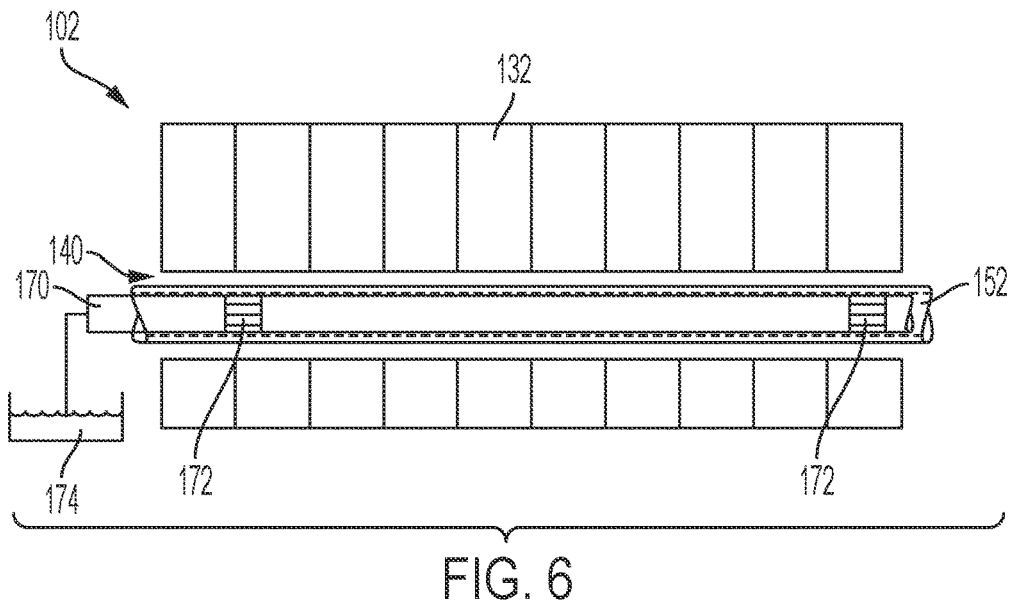

Referring to FIGS. 6 and 9, in an insertion step 204, a hydraulic expansion tool 170 is inserted into the lumen of the linear tubes 152 loosely accommodated in the cooling channels 140. The hydraulic expansion tool 170 is an elongated device that may correspond in shape to the lumen of the linear tubes 152 and typically may have a smaller dimension to facilitate insertion. Accordingly, after insertion, the hydraulic expansion tool 170 is generally situated coaxially in the linear tube 152. The hydraulic expansion tool 170 can include one or more cam-actuated segments 222 that, when actuated, can expand radially outward. The cam-actuated segments 172 can be located over the length of the hydraulic expansion tool 170 in a manner that can generally correspond with the axial length of the stator core 102. In other examples, the hydraulic expansion tool may include other expansion devices features like inflatable bladders.

Figure 7:
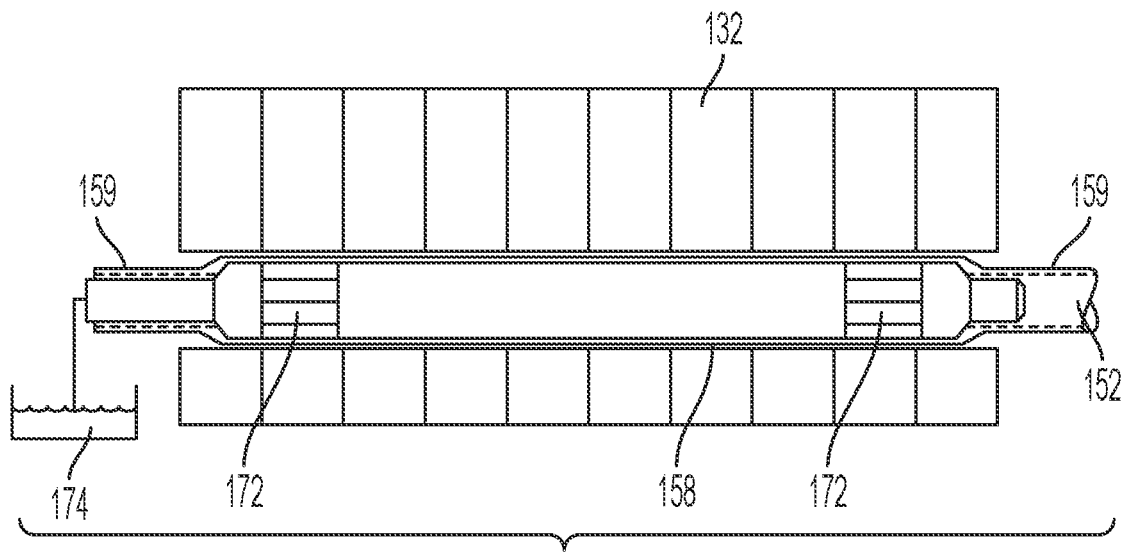

Referring to FIGS. 7 and 9, in an expansion step 206, the cam-actuated segments 172 can be hydraulically expanded to displace symmetrically outwardly and engage the inner surface of the cooling channels 140 in the stator core 102. In particular, hydraulic fluid such as water can be delivered from a reservoir 174 to the hydraulic expansion tool 170 under substantial pressure using hydraulic hoses. Radial contact between the expanded segments 172 and the inner surfaces of the linear tubes 152 outwardly displaces the linear tubes to contact and conform with the shape of the cooling channels 140. Conforming the linear tubes 152 to the cooling channels 140 is facilitated in the examples where the linear tubes 152 are made of a material like copper or brass that is relative soft compared to the ferromagnetic steel or iron of the stator core 102. Conformance of the linear tubes 152 to the cooling channels 140 results in frictionally fixing the linear tube 152 within the cooling channel 140 and ensures adequate thermal contact regardless of variances or disruptions in the cooling channels.

The difference in axial length between the hydraulic expansion tool 170 and the axial length of the linear tube 152 may result in the linear tubes having an expanded linear segment 158 located inside the stator core 102 and first and second unexpanded linear end segments 159 that protrude from the stator core 102. Further, the hydraulic expansion tool 170 can be axially positioned at select locations within the linear tubes 152 to expand select regions within the stator core 102 rather than over the complete axial length of the linear tube 152 and the stator core 102. For example, the length of the hydraulic expansion tool 170 may be less than the axial length of the linear tube 150 and the tool can be inserted to select axial positions prior to expansion. This allows control over where the expanded linear segments 158 are axially located within the linear tube 152 and the cooling channel 140 providing improved dimensional control and anchoring of the linear tube to the stator core.

Figure 8:
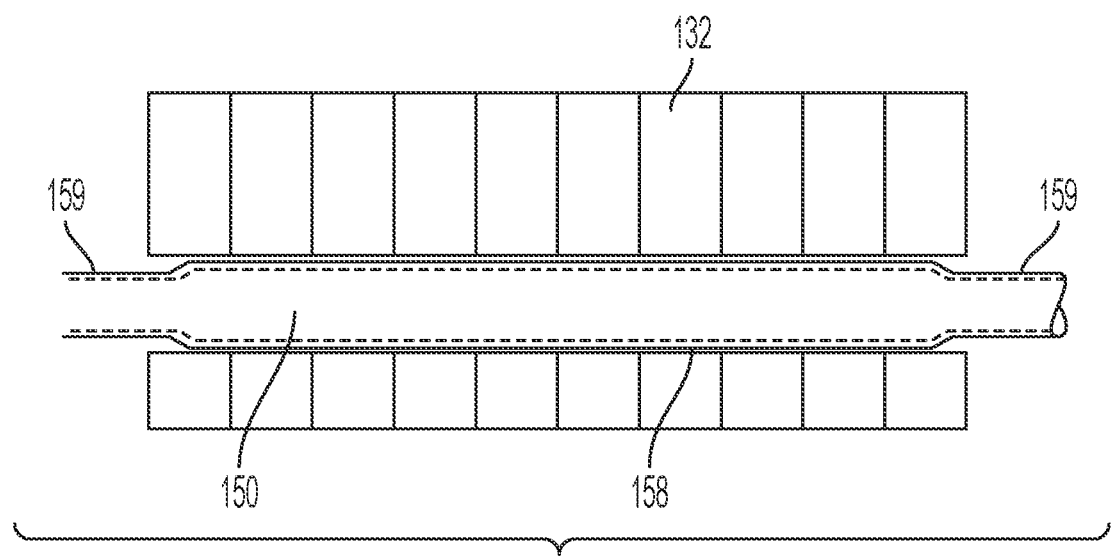

Referring to FIGS. 8 and 9, in a removal step 208, the hydraulic pressure in the hydraulic expansion tool 220 can be relieved and the cam-actuated segments retracted to remove the hydraulic expansion tool from the lumen of the expanded linear segment 158 fixed and anchored in cooling channel 140 of the stator core 102 with the unexpanded linear end sections 159 protruding from the first and second axial end faces 114, 116 of the stator core 102. After the hydraulic expansion tool 170 is removed, in a coupling step 210 and with reference to FIGS. 1 and 2, the elbow tubes 154 and the traverse tubes 156 can be attached to the linear tubes 152 to complete the internal cooling circuit. The elbow tubes 154 and the traverse tubes 156 remain unexpanded and remain dimensionally matched to unexpanded linear end segments 158 of the linear tubes 152 protruding from the stator core 102 to facilitate joinder by welding to the like.

After the elbow tubes 154 and the traverse tubes 156 are joined to the unexpanded tube end portions 159 of the linear tubes 152, in a casting step 212 the stator end castings 160 can be formed on the axial end faces 114, 116 to encapsulate the end turns 128 and to be disposed about the elbow tubes 154 and the traverse tubes 156. The stator end castings 160 protect the end turns 128 and the elbow tubes 154 and traverse tubes 156 located exteriorly of the stator core 102 while enabling thermal conduction of heat by establishing a thermal conductive path between the end turns 128 to the elbow tubes 154.

Referring to FIGS. 1 and 2, the fluidly coupled cooling tubes 150 may be in continuous fluid communication with each other to provide a single internal cooling circuit of the stator assembly 100. For example, the linear tubes 152 can extend through each of the inside corners 120 of the stator core 102, thereby making several axial passes, and can partially circumnavigate the end turns 128 in the stator end casting 160. Accordingly, the liquid coolant medium can be provided from a common reservoir and pumping system and discharged to a common heat exchanger to facilitate heat transfer from both the stator core 102 and from the end turns 128 disposed in the stator end castings 160. In addition, because of the fictionally fixed relation between the linear tubes 152 and the stator core 102, the liquid coolant medium can be directed through the internal cooling circuit under minimum pressure to avoid rupture of the joints connecting the cooling tubes 150. In other examples, the cooling tube 150 may be disposed in a plurality of parallel paths and/or series paths with respect to the stator core 102 to provide multiple cooling circuits.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A stator assembly for a rotating electrical machine comprising:
   a stator core including a first axial end face and a second axial end face and defining a rotor bore disposed between the first and second axial end faces, the rotor bore aligned along a stator axis extending through the stator core;
   the stator core further including a plurality of cooling channels disposed therein, the plurality of cooling channels radially offset from and parallel to the stator axis;
   a plurality of conductive windings disposed circumferentially about the rotor bore, the plurality of conductive windings forming a plurality of end turns protruding beyond the first axial end face and the second axial end face;
   a first stator end casting disposed adjacent the first axial end face of the stator core and a second stator end casting disposed adjacent the second axial end face of the stator core, the first and second stator end castings comprised of a thermally conductive, electrically insulating material and encapsulating the plurality of end turns; and
   a plurality of cooling tubes including a plurality of linear tubes and a plurality of elbow tubes; each of the plurality of linear tubes having an initial tube diameter less than a channel diameter of the cooling channels and each of the plurality of linear tubes disposed in and expanded to make a friction fit with a respective one of the cooling channels in the stator core with a first unexpanded linear end segment protruding from the first axial end face; each of the plurality of elbow tubes disposed in the stator end castings with each of the plurality of elbow tubes fluidly coupling at least two of the linear tubes.

2. The stator assembly of claim 1, wherein each of the plurality of elbow tubes are joined to the respective linear tubes at the first unexpanded linear end segment and a second unexpanded linear end segment.

3. The stator assembly of claim 2, wherein the stator core has an outer periphery extending about the axis and having a generally polygonal shape.

4. The stator assembly of claim 3, wherein the polygonal outer periphery including a plurality of corners and the cooling channels and linear tubes disposed therein are located within an inside corner of the stator core.

5. The stator assembly of claim 4, wherein the plurality of elbow tubes includes a first set of 180° elbow tubes and a second set of 90° elbow tubes.

6. The stator assembly of claim 5, wherein each of the first set of 180° elbow tubes are arranged to fluidly couples two of the linear tubes disposed in the same inside corner.

7. The stator assembly of claim 6, wherein each of the second set of 90° elbow tubes are arranged to fluidly couple two linear tubes disposed in different inside corners.

8. The stator assembly of claim 7, wherein the plurality of cooling tubes further includes a plurality of traverse tubes with each of the plurality of traverse tubes fluidly couples at least two of the second set of 90° elbow tubes.

9. The stator assembly of claim 8, wherein each of the plurality of traverse tubes are disposed in one of the first and second stator end castings.

10. The stator assembly of claim 9, wherein each of the plurality of cooling tubes are in fluid communication with each other to provide a single internal cooling circuit of the stator assembly.

11. The stator assembly of claim 10, wherein the polygonal outer periphery is shaped as a chamfered square.

12. The stator assembly of claim 1, wherein the thermal conductive, electrically insulating material of the first and second stator end castings is composed of a potting material.

13. The stator assembly of claim 12, wherein the potting material is silicone based and includes metal fillers.

14. The stator assembly of claim 1, wherein the stator core includes a plurality of laminations arranged axially adjacent to each other in a lamination stack corresponding to the stator core.

15. The stator assembly of claim 1, wherein each of the linear tubes include a second unexpanded linear end segment protruding from the second axial end face.

16. The stator assembly of claim 15, wherein each of the cooling channels is at least axially coextensive with an expanded linear segment of the respective linear tube therein.

17. The stator assembly of claim 1, wherein a material of the plurality of cooling tubes is one of copper or bronze.

18. The stator assembly of claim 1, wherein the plurality of cooling channels each have a circular cross-section.

* * * * *